United States Patent [19]

Van Gilst

[11] Patent Number: 5,363,806
[45] Date of Patent: Nov. 15, 1994

[54] PIG FEEDING MAT

[75] Inventor: Carl W. Van Gilst, Goshen, Ind.

[73] Assignee: Agri-Engineering, Inc., Goshen, Ind.

[21] Appl. No.: 100,393

[22] Filed: Aug. 2, 1993

[51] Int. Cl.$^5$ ............................................. A01K 5/00
[52] U.S. Cl. ............................................................ 119/61
[58] Field of Search ..................... 119/61, 28, 51.01; 15/215; 5/417; 4/581, 582

[56] References Cited

U.S. PATENT DOCUMENTS

| | | | |
|---|---|---|---|
| 1,401,788 | 12/1921 | Kelleher | 15/215 |
| 1,409,125 | 3/1922 | Stanwood | 15/215 |
| 1,970,754 | 8/1934 | Jonasen | 119/28 |
| 2,596,735 | 5/1952 | Suarez | 4/581 X |
| 2,665,664 | 1/1954 | Benjamin | 119/28 |
| 2,789,537 | 4/1957 | Bailey . | |
| 3,387,315 | 6/1968 | Stata | 15/215 |
| 3,390,912 | 7/1968 | Stata | 15/215 |
| 3,884,188 | 5/1975 | Arends | 119/28 X |
| 4,955,321 | 9/1990 | Waldner . | |

OTHER PUBLICATIONS

Creep Pad; Agri-Plastics, Inc.; AP113SP787; (nd, np).

*Primary Examiner*—Gene Mancene
*Assistant Examiner*—Thomas Price
*Attorney, Agent, or Firm*—Wendell E. Miller

[57] ABSTRACT

A pig feeding mat (10) is provided for use over a grated floor (12). The pig feeding mat (10) includes a rectangular surface (14) having first and second ends (16 and 18) and a perimeter (20). A rim (22) around the perimeter (20) restrains movement of solid material transversely over the perimeter (20). A plurality of spaced-apart gaps (24) in the rim (22) allow liquid to drain from the pig feeding mat (10). Paired lugs (26 and 28, or 32 and 34) disposed at respective ends (16 and 18) of the mat (10) are used to position the mat (10) under a partition (50 or 52) of a feeding stall (44) by invertedly straddling the mat (10). The mat (10) can be cut along a joggled groove (40) to separate the rectangular surface (14) into first and second surface portions (36 and 38), to be used in separate feeding areas (64 and 66).

16 Claims, 3 Drawing Sheets

PIG FEEDING MAT

BACKGROUND OF THE INVENTION

In the production of pork, as in animal husbandry and also in all competitive industries, competition continually becomes more intense, and economic survival is for the fittest. In this never-ending quest for economic survival, it is necessary to achieve a maximum growth rate of pigs while minimizing the cost of feed. It is also necessary to wean the pigs at as young an age as possible, so that the sow may be returned to her primary job of producing the next litter of pigs.

Modern swine husbandry allows for pigs to be weaned from the sow at a young age of three weeks or less. To achieve this goal, it is imperative that the pigs have started eating solid feed in the form of pellets or crumbles by this time. The preferred means of starting pigs on feed is to sprinkle small quantities in the area where they rest.

The preferred resting area for these small pigs is a soft mat made of rubber or similar materials, but when feed is sprinkled on a traditional mat, it rolls or is pushed off the edge where it then falls through the perforated flooring surrounding the mat. With diligence, sufficient quantities of feed can be provided to replace the feed that falls through the perforated flooring, however, this method generates large quantities of waste resulting in large financial losses.

In summary, the present invention provides a method of feeding young pigs that minimizes food waste, minimizes food cost, helps to wean pigs at a young age, and returns the sow to pig production at the earliest possible time.

SUMMARY OF THE INVENTION

In the present invention, apparatus is provided for feeding young pigs over a grated floor during about the first three weeks following birth, which during this critical time period: encourages weaning of the pigs from the sow, encourages the pigs to start eating solid feed, and dramatically reduces the amount of wasted feed.

The apparatus of the present invention includes a rectangular surface having first and second ends and a perimeter; means, comprising a rim around the perimeter, for restraining movement of solid material transversely over the perimeter; means, comprising a plurality of spaced-apart gaps in the rim, for draining liquid from the mat; while the mat remains in a substantially horizontal position and means, comprising first and second paired lugs being proximal to the first and second ends, respectively, for positioning the mat on the grated floor. This positioning of the mat is accomplished by a side partition pressing downwardly on the mat intermediate of respective ones of the lugs. That is, as the lugs invertedly engage the partition, transverse positioning of the mat is achieved.

The apparatus of the present invention also includes a plurality of spaced apart traction ribs to help the pigs position themselves for feeding; a joggled groove, for locating a cutting path used to separate the rectangular surface into first and second surface portions; and means, comprising third and forth paired lugs being proximal to the first and second ends, respectively, for positioning the second surface portion after it is separated from the rectangular surface. That is, transverse positioning of the second surface portion is achieved by the third and fourth paired lugs invertedly engaging a partition.

However, in a preferred embodiment, pigs are confined to a feeding stall that is adjacent to other feeding stalls, and the feeding mat is used in the feeding stall to cover the grated floor near the sides of the confined sow. That is, preferably, the sow is restricted to a middle section of the feeding stall while the pigs are allowed to move freely about the stall to find the best position for feeding from the sides of the sow, and in these areas the feeding mat is most effective.

The apparatus and method of the present invention achieves efficient low cost means for feeding young pigs by providing a comfortable resting area near the sow which, while exposing the pigs to the sow, also allows the pigs to be exposed to solid feed with a minimal amount of feed waste.

Further, the apparatus and method of the present invention achieves drainage of harmful liquids from the mat which further reduces feed waste.

In a first aspect of the present invention, a pig feeding mat is provided for use over a grated floor, which mat comprises: a rectangular surface having first and second ends and a perimeter; means, including a rim around the perimeter, for restraining movement of solid material transversely over the perimeter; and means, comprising a plurality of spaced-apart gaps in the rim, for draining liquid from the mat while the mat is disposed in a substantially horizontal position.

In a second aspect of the present invention, a pig feeding mat is provided for use over a grated floor, which mat comprises a rectangular surface having first and second ends and a perimeter; means, including a rim around the perimeter, for restraining movement of solid material transversely over the perimeter; means, including a plurality of spaced-apart gaps in the rim, for draining liquid from the mat while the mat is disposed in a substantially horizontal position; and means, including first and second paired lugs being proximal to the first and second ends, respectively, for positioning the mat on the grated floor between first and second feeding stalls by the lugs invertedly straddling a side partition.

In a third aspect of the present invention, a pig feeding mat is provided for use over a grated floor, which mat comprises a rectangular surface having first and second ends, a perimeter, and means, including a joggled groove, for locating a cut used to separate the rectangular surface into first and second surface portions; means, including a rim around the perimeter, for restraining movement of solid material transversely over the perimeter; and means, including a plurality of spaced-apart gaps in the rim, for draining liquid from the mat while the mat is disposed in a substantially horizontal position.

In a fourth aspect of the present invention, a pig feeding mat is provided for use over a grated floor, which mat comprises a rectangular surface having first and second ends, a perimeter, and means, including a joggled groove, for locating a cut used to separate the rectangular surface into first and second surface portions; means, including a rim around the perimeter that is an integral molded part of the mat, for restraining movement of solid material transversely over the perimeter; means, including a plurality of spaced-apart gaps in the rim, for draining liquid from the mat while the mat is disposed in a substantially horizontal position; and the means for draining comprises one of the gaps being disposed on each side of the joggled groove.

In a fifth aspect of the present invention, a pig feeding mat is provided for use over a grated floor, which mat comprises a rectangular surface having first and second ends and a perimeter, having means, including a joggled groove, for locating a cut for separating the rectangular surface into first and second surface portions, for positioning the mat on the grated floor by positioning the partition between the first and second paired lugs, and having means, including a plurality of spaced-apart traction ribs, for helping pigs position themselves on the rectangular surface; means, including a rim around the perimeter, that is an integral molded part of the mat, for restraining movement of solid material transversely over the perimeter; and means, including a plurality of spaced-apart gaps in the rim, for draining liquid from the mat while the mat is disposed in a substantially horizontal position.

In a sixth aspect of the present invention, a method is provided for feeding pigs over a grated floor, which method comprises: placing a mat onto the grated floor; placing granulated food onto the mat; restraining movement of the food from the mat; and draining fluids from the mat.

In a seventh aspect of the present invention, a method is provided for feeding pigs over a grated floor, which method comprises: confining pigs within a feeding stall having first and second side partitions; placing a mat onto the grated floor proximal to the side partitions; placing granulated food onto the mat; restraining movement of the food from the mat; and draining fluids from the mat.

DESCRIPTION OF THE PREFERRED EMBODIMENTS

Figure 1:
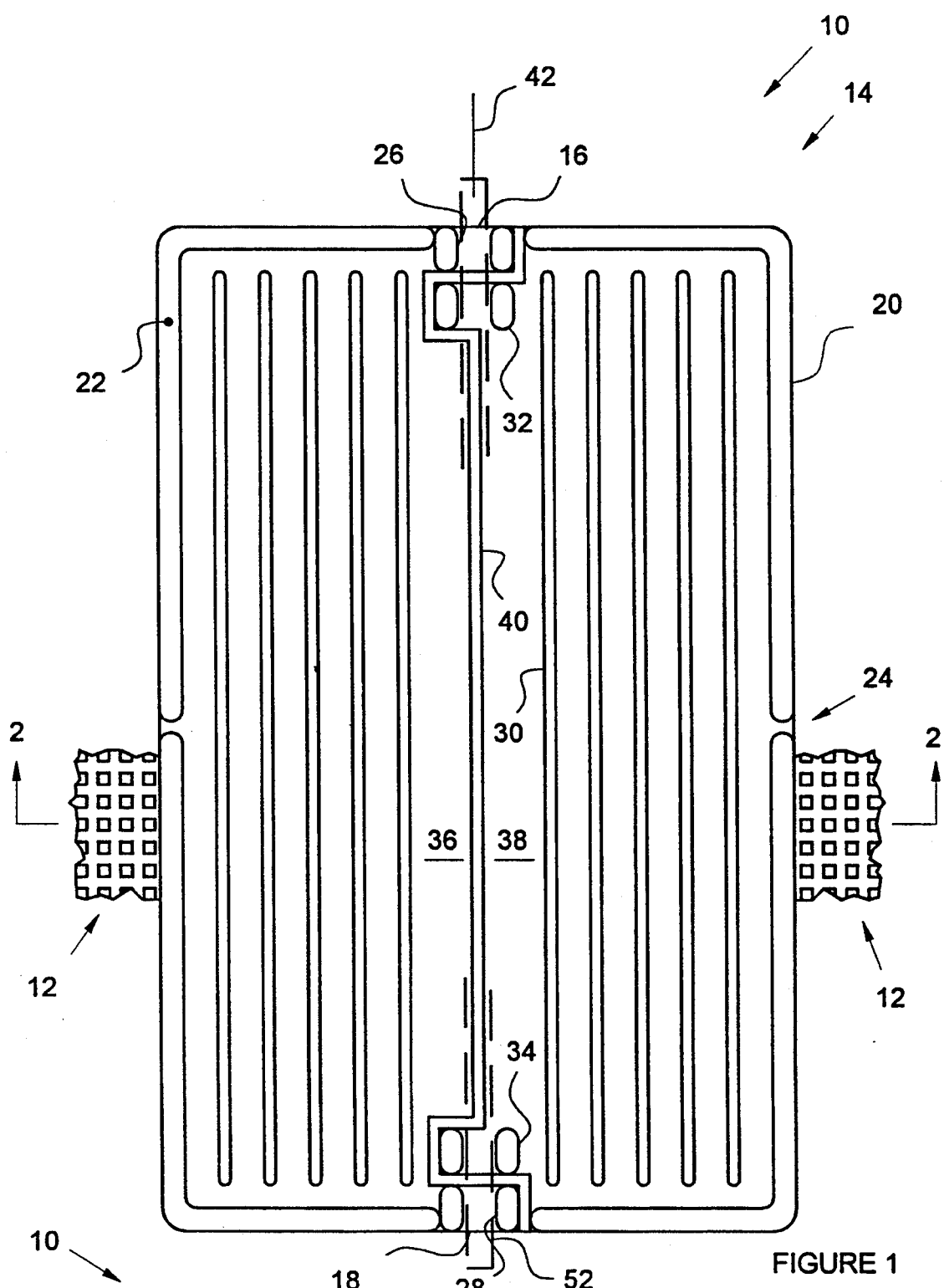
FIG. 1 is a top view of the apparatus of the present invention, showing, by phantom lines, a side partition positioned transversely by paired lugs that invertedly engage the side partition.
Figure 2:
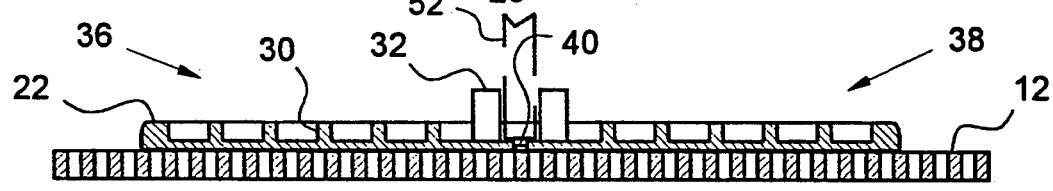
FIG. 2 is a side elevation of the apparatus of the present invention of FIG. 1, taken substantially as shown by view line 2—2 of FIG. 1, and showing, by phantom lines, a side partition that is transversely positioned by paired lugs that invertedly straddle the side partition.
Figure 3:
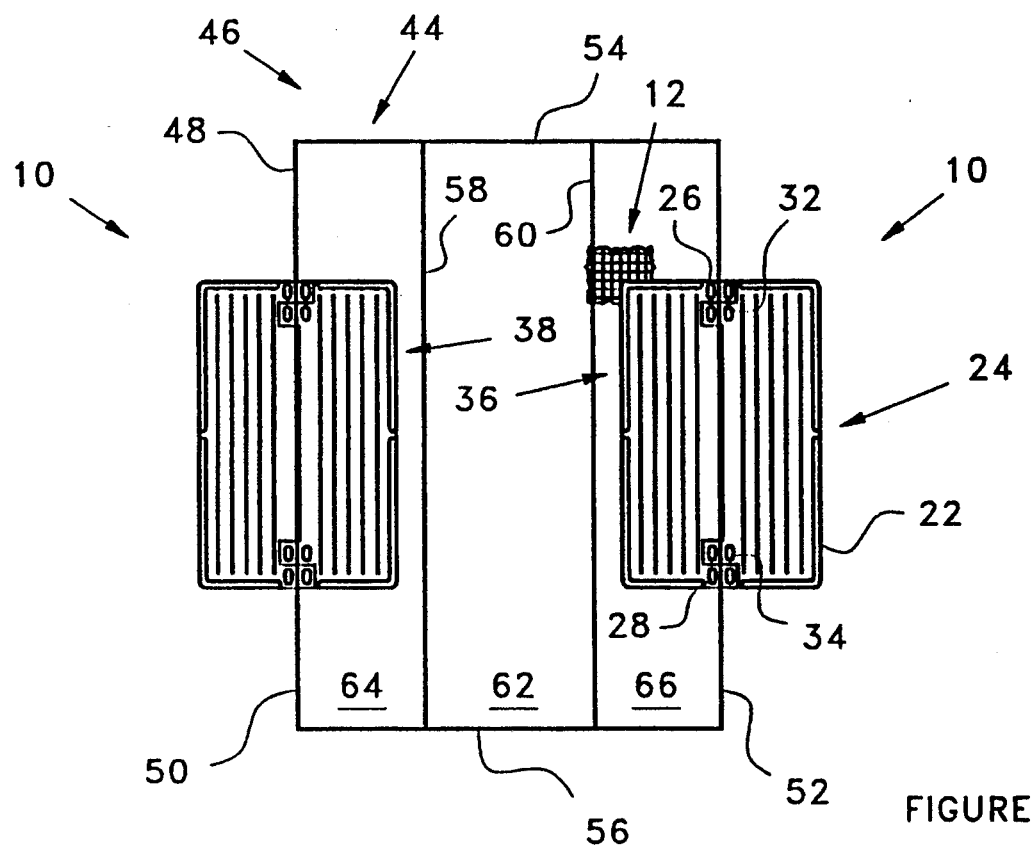
FIG. 3 is a top view of a feeding stall with the apparatus of the present invention shown disposed in the feeding stall.

Referring now to FIGS. 1, 2, and 3, and particularly to FIGS. 1 and 2, a pig feeding mat 10 for use over a grated floor 12 includes: a rectangular surface 14; a first end 16 and a second end 18; an outer perimeter 20 which circumscribes the ends 16 and 18; a rim, or barrier, 22 that is disposed around the perimeter 20 for restraining movement of solid materials transversely over the perimeter 20, and which comprises a plurality of spaced-apart gaps 24 for draining liquid from the mat 10 while the mat 10 remains in a substantially horizontal position; and first paired lugs 26 and second paired lugs 28, being proximal to the ends 16 and 18, respectively, for positioning the mat 10 on the grated floor 12 in a manner which will be described subsequently. The rectangular surface 14 includes longitudinally disposed traction ribs, or spaced-apart traction ribs, 30 which provide means for helping pigs situate themselves alongside a sow for nursing.

The mat 10 also includes third paired lugs 32 and fourth paired lugs 34, and a first surface portion 36 and a second surface portion 38 being disposed adjacent to a joggled groove 40 that is longitudinally situated proximal to a longitudinal center 42 of the mat 10.

Referring now to FIG. 3, a pig feeding stall 44 is placed on the grated floor 12 to provide a confined area 46 for the sow and young nursing pigs (sow and pigs not shown). The confined area 46 of the stall 44 is characterized by an outer perimeter 48 which includes a first side partition 50 and a second side partition 52, and a first end partition 54 and a second end partition 56. A first partial partition 58 and a second partial partition 60 are disposed between the first and second side partitions, 50 and 52, to confine the sow to a middle section 62 of the confined area 46, and to provide a first feeding area 64 and a second feeding area 66 situated on either side of the sow. The grated floor 12 allows waste materials to pass through to a subflooring (not shown, not an inventive part of this invention) to maintain a clean stall 44.

The first and second partial partitions, 58 and 60, restrict the sow from entering the feeding areas 64 and 66, but they do not restrict the smaller pigs from passing through to the middle section 62 or from accessing either of the feeding areas 64 or 66. This configuration allows the pigs to nurse from either side of the sow and to avoid being laid on by the sow.

The paired lugs 26, 28, 32, and 34 provide the means for positioning the mat 10 under the side partition 50 or 52. As shown in FIG. 3, and as more clearly shown in FIGS. 1 and 2, the paired lugs 26, 28, 32, and 34 are situated to invertedly straddle the side partition 50 or 52 to firmly restrict transverse movement of the mat 10 as the sidewall partition, 50 or 52, rests on the mat 10 intermediate of the paired lugs 26, 28, 32, or 34.

Figure 4:
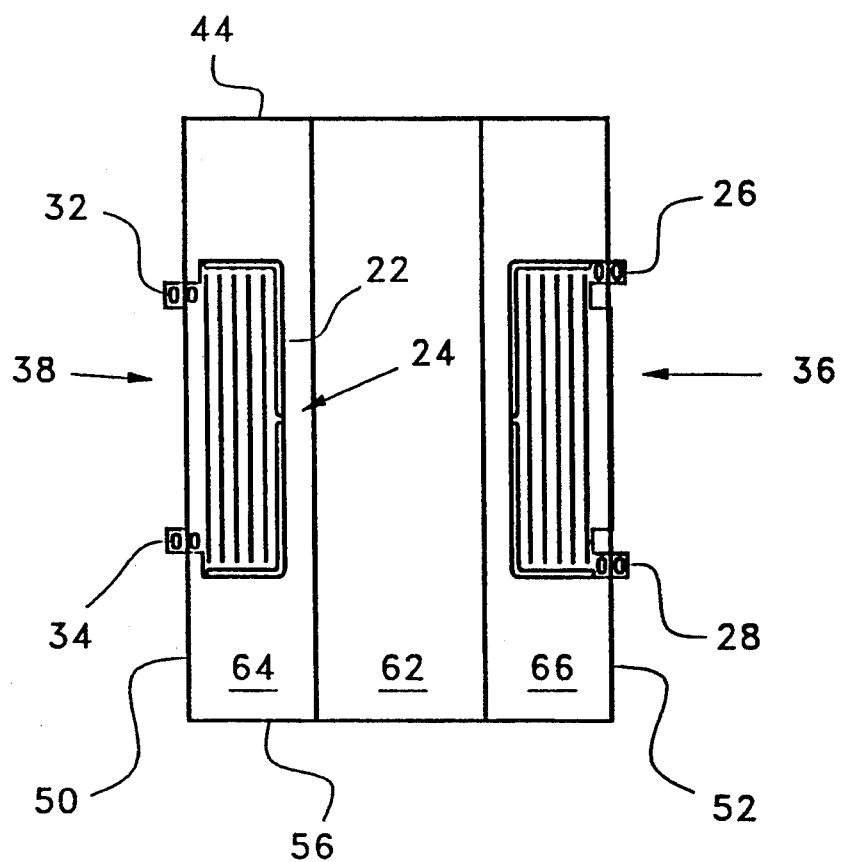
FIG. 4 is a top view of a feeding stall with the apparatus of the present invention shown cut into first and second surface portions disposed in the feeding stall.

Referring now to FIGS. 1, 2, and 4, the joggled groove 40 provides means for locating a cut in the rectangular surface 14 which separates the surface portions 36 and 38 such that the first and second paired lugs, 26 and 28, are disposed on the first surface portion 36, and the third and fourth paired lugs 32 and 34, are disposed on the second surface portion 38. In this way, one mat 10 can be cut along the joggled grove 40 to allow the first surface portion 36 to be used in one of the feeding areas 64 or 66, and to allow the second surface portion 38 to be used in the other of the feeding areas 66 or 64, as seen in FIG. 4.

Therefore, when the mat 10 is cut along the joggled groove 40 separating the surface portions 36 and 38, the first and second paired lugs, 26 and 28, provide the means to position the first surface portion 36, and the third and fourth paired lugs, 32 and 34, provide the means to position the second surface portion 38. That is, as shown in FIG. 4, the first surface portion 36 is located under the side partition 52, and the second surface portion 38 is located under the side partition 50, the paired lugs 26 and 28 invertedly straddling the side partition 52, and the paired lugs 32 and 34 invertedly straddling the side partition 50, thereby firmly restricting transverse movement of the surface portions 36 and 38.

The mat 10 can be made of any suitable material that will provide a soft warm resting area that will attract and encourage the young pigs to use the mat 10, but the preferred type of material is rubber.

Figure 5:
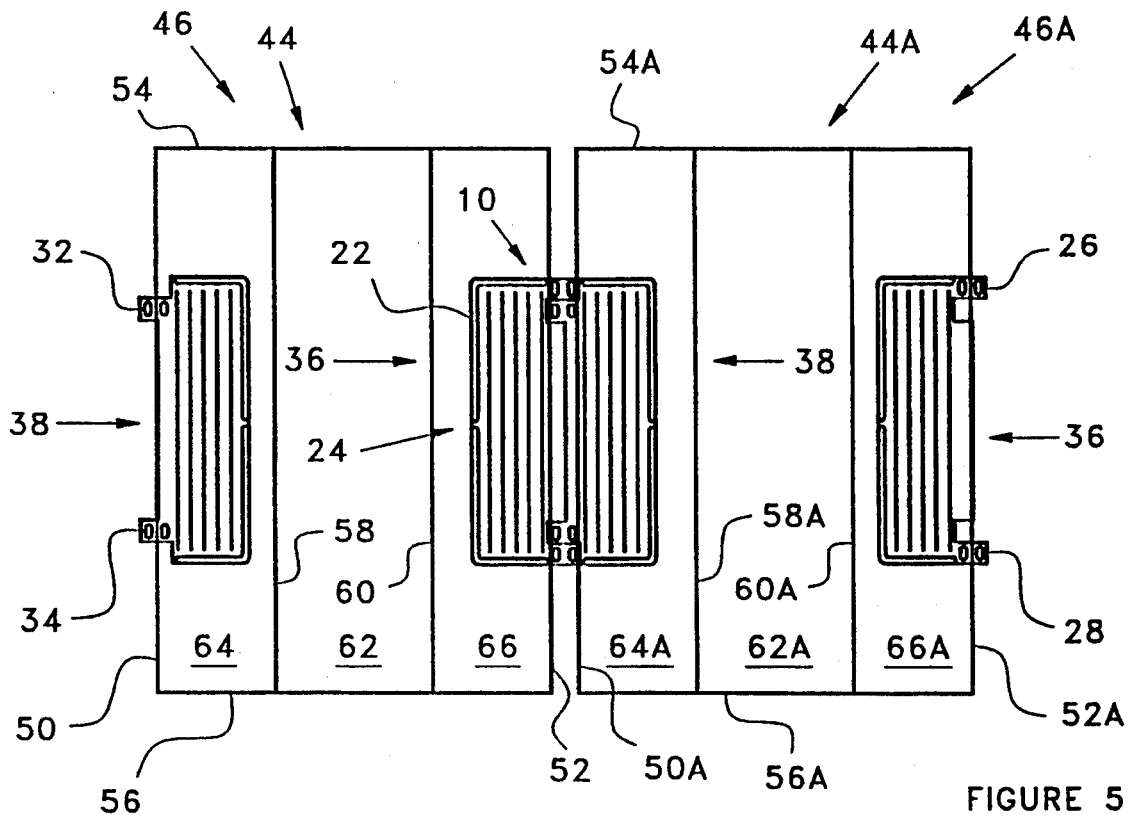
FIG. 5 is a top view of adjacent feeding stalls with the apparatus of the present invention disposed within the adjacent feeding stalls.

Referring now to FIG. 5, in a typical application of the present invention, a second feeding stall 44A, having like-named and like-numbered parts except for the addition of an 'A' suffix, will be situated adjacent to the first stall 44, and the mat 10 will be situated between the stalls 44 and 44A with the paired lugs 26, 28, 32, and 34 proximal to the side partition 52 of the first stall 44 and proximal to the side partition 50A of the second stall 44A. In this manner, the mat 10 will overlap the confined areas 46 and 46A of stalls 44 and 44A, respectively. For example, the first surface portion 36 of the mat 10 will lie in the second feeding area 66 of the stall 44, and the second surface portion 38 of the mat 10 will lie in the first feeding area 64A of the stall 44A. The side partition 52 of the stall 44 and the side partition 50A or 52A of the stall 44A straddle the paired lugs 26, 28, 32, and 34, forming a means to restrain transverse movement of the mat 10.

Figure 6:
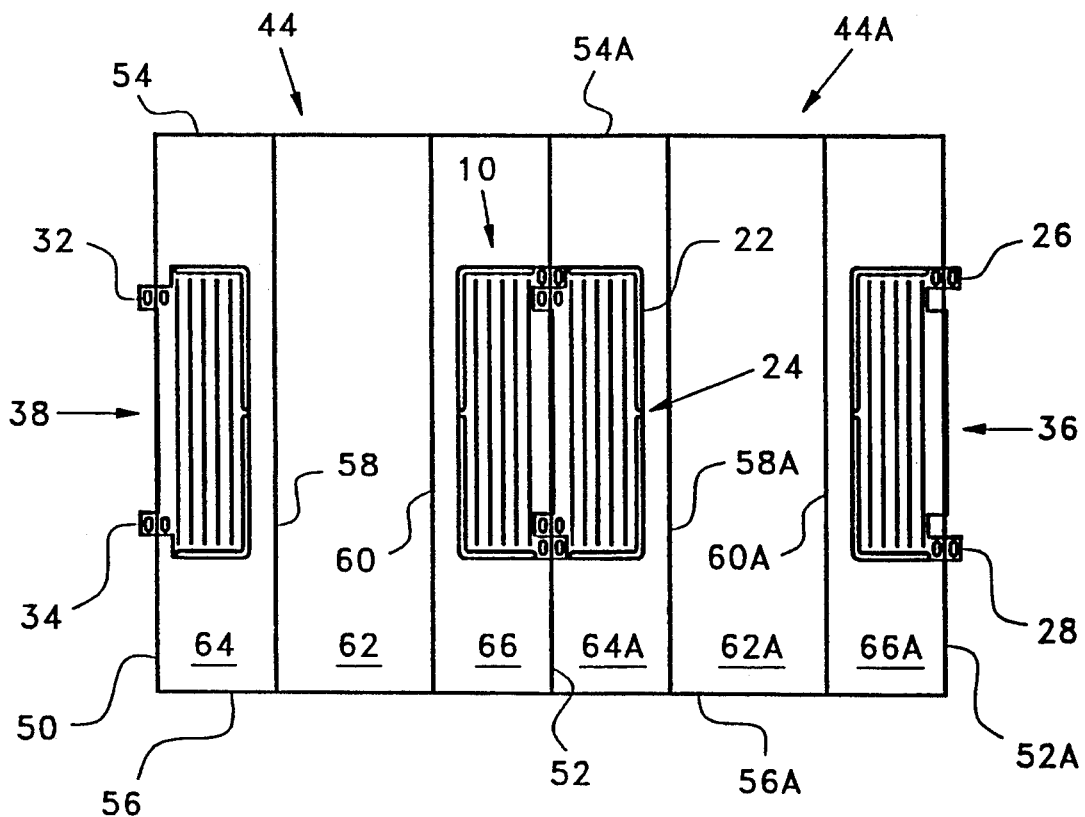
FIG. 6 is a top view of attached adjacent feeding stalls with the apparatus of the present invention disposed within the adjacent feeding stalls.

Referring now to FIG. 6, in a more practical application, the stall 44A is attached to the stall 44, which reduces wasted floor space and allows the stall 44A to use the side partition 52 of the stall 44, eliminating the side partition 50A or 52A of the stall 44A. In this shared configuration, the mat 10 is situated under the shared side partition 52 and the paired lugs 26, 28, 32, and 34 to straddle the side partition 52, forming the means to restrain transverse movement of the mat 10.

Referring to FIGS. 1 and 3, the method of the present invention includes placing the feeding stall 44 on the grated floor 12; placing the mat 10 over the grated floor 12 in the feeding areas 64 and 66 proximal to one of the side partitions 50 or 52; confining the sow and pigs to the feeding stall 44 during about the first three weeks after the pigs are born; placing granulated food on the mat 10 in the feeding areas 64 and 66 to encourage the young pigs to start eating solid food; disposing the traction ribs 30 longitudinally on the mat 10 to help the pigs situate themselves beside the sow for nursing; disposing the first and second paired lugs, 26 and 28, proximal to the ends 16 and 18, respectively, of the mat 10 for positioning the mat 10 and restraining transverse movement of the mat 10 by the paired lugs, 26 and 28, invertedly straddling one of the side partitions, 50 or 52; disposing the joggled groove 40 longitudinally on the mat 10 for locating a cut on the mat 10 to separate the mat 10 into the first and second surface portions, 36 and 38; disposing the third and fourth paired lugs, 32 and 34, proximal to the ends 16 and 18, respectively, of the mat 10 for positioning the second surface portion 38 and restraining transverse movement of the second surface portion 38; disposing the barrier 22 around the perimeter 20 of the mat 10 to restrain movement of the food transversely over the perimeter 20; and disposing the gaps 24 in the perimeter 20 to allow liquid to drain from the mat 10 while the mat 10 remains in a substantially horizontal position.

Typically, the mat 10 does not cover the entire grated floor 12 in each feeding area 64 and 66 to allow places off the mat 10 for the pigs to relieve themselves, which typically occurs near the corners of the feeding stall 44. Typically, the pigs will rest on the mat 10 because it is warmer and less drafty then the grated floor 12, so placing granulated food on the mat 10 makes the food most readily available for the pigs to start to eat. The rim 22 around the perimeter 20 restrains movement of the food from the mat 10 as the pigs try to eat it or push it around, thus minimizing the amount of food wasted by falling through the grated floor 12. The gaps 24 disposed in the barrier 22 around the perimeter 20 allow liquids to drain from the mat 10 which further reduces the amount of food wasted.

In summary, the present invention provides apparatus and method for feeding pigs confined in a feeding stall which provides a comfortable resting area that encourages early weaning and early feeding on solid food, with a minimum amount of feed wasted in the process.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

INDUSTRIAL APPLICABILITY

The present invention is applicable to swine husbandry which includes the feeding of pigs up to about the age of three weeks old, and to any animal feeding process that involves a grated flooring.

What is claimed is:

1. A pig feeding mat (10) for use over a grated floor (12), which mat comprises:
   a rectangular surface (14) having first and second ends (16 and 18) and a perimeter (20);
   means, comprising a rim (22) around said perimeter, for restraining movement of solid material transversely over said perimeter;
   means, comprising a plurality of spaced-apart gaps (24) in said rim, for draining liquid from said mat while said mat is disposed in a substantially horizontal position; and
   means, including first and second paired lugs (26 and 28) being proximal to said first and second ends (16 and 18), respectively, for positioning said mat on said grated floor (12) between first and second feeding stalls (44 and 44A) by said lugs invertedly straddling a side partition (50, 50A, 52, or 52A).

2. A pig feeding mat (10) as claimed in claim 1 in which said means for positioning said mat further comprises means, including third and fourth paired lugs (32 and 34) that are proximal to said first and second ends (16 and 18), respectively, for invertedly straddling a side partition (50, 50A, 52, or 52A).

3. A pig feeding mat (10) for use over a grated floor (12), which mat comprises:
   a rectangular surface (14) having first and second ends (16 and 18), a perimeter (20), and means, comprising a joggled groove (40), for locating a cut used to separate said rectangular surface into first and second surface portions (36 and 38);
   means, comprising a rim (22) around said perimeter, for restraining movement of solid material transversely over said perimeter; and means, comprising a plurality of spaced-apart gaps (24) in said rim, for draining liquid from said mat while said mat is disposed in a substantially horizontal position.

4. A pig feeding mat (10) for use over a grated floor (12), which mat comprises:
   a rectangular surface (14) having first and second ends (16 and 18), a perimeter (20), and means, comprising a joggled groove (40), for locating a cut used to separate said rectangular surface into first and second surface portions (36 and 38);
   means, comprising a rim (22) around said perimeter that is an integral molded part of said mat, for restraining movement of solid material transversely over said perimeter;
   means, comprising a plurality of spaced-apart gaps (24) in said rim, for draining liquid from said mat while said mat is disposed in a substantially horizontal position; and
   said means for draining comprises one of said gaps (24) being disposed on each side of said joggled groove.

5. A pig feeding mat (10) for use over a grated floor (12), which mat comprises:
   a rectangular surface (14) having first and second ends (16 and 18) and a perimeter (20), having means, comprising a joggled groove (40), for locating a cut for separating said rectangular surface into first and second surface portions (36 and 38), having means, comprising first and second paired lugs (26 and 28), for positioning said mat on said grated floor (12) by positioning said partition between said first and second paired lugs, and having means, comprising a plurality of spaced-apart traction ribs (30), for helping pigs position themselves on said rectangular surface (14);
   means, comprising a rim (22) around said perimeter, that is an integral molded part of said mat, for restraining movement of solid material transversely over said perimeter; and
   means, comprising a plurality of spaced-apart gaps (24) in said rim, for draining liquid from said mat while said mat is disposed in a substantially horizontal position.

6. A method for feeding pigs over a grated floor, which method comprises:
   a) placing a mat onto said grated floor;
   b) placing granulated food onto said mat;
   c) restraining movement of said food from said mat; and
   d) draining fluids from said mat.

7. A method as claimed in claim 6 in which said restraining step comprises disposing a barrier around a perimeter of said mat;
   the first said placing step comprises placing said mat in a substantially horizontal position; and
   said draining step comprises draining fluids from said mat while said mat remains in said substantially horizontal position.

8. A method as claimed in claim 6 in which said restraining and draining steps comprise:
   a) disposing a barrier around a perimeter of said mat; and
   b) disposing a gap in said barrier for said fluid to drain through.

9. A method as claimed in claim 6 in which:
   a) the first said placing step comprises placing said mat in a substantially horizontal position;
   b) said restraining step comprises disposing a barrier around a perimeter of said mat, and attaching said barrier to said mat as an integral molded portion of said perimeter; and
   c) said draining step comprises means for placing a plurality of spaced-apart gaps in said barrier and draining fluid from said mat while said mat remains in said substantially horizontal position.

10. A method as claimed in claim 6 in which said method further comprises:
    a) attaching first and second paired lugs proximal to first and second ends, respectively, of said mat;
    b) positioning said mat under a partition such that said paired lugs invertedly straddle said partition; and
    c) using said positioning step to restrain transverse movement of said mat.

11. A method as claimed in claim 6 in which:
    a) said method further comprises separating said mat into first and second surface portions;
    b) the first said placing step comprises separately placing said first and second surface portions substantially horizontal; and
    c) said draining step further comprises draining fluids separately from said first and second surface portions while said first and second surface portions remain substantially horizontal.

12. A method as claimed in claim 6 in which said method further comprises:
    a) disposing first and second paired lugs proximal to first and second ends, respectively, of said mat:
    b) said restraining step comprising disposing a barrier around a perimeter of said mat;
    c) said draining step comprising disposing a gap in said barrier for said fluids to drain through;
    d) disposing traction ribs on said mat to help pigs position themselves for effective feeding; and
    e) using said lugs to invertedly straddle a partition.

13. A method as claimed in claim 12 in which said restraining step further comprises disposing said barrier around said perimeter as an integral molded portion of said mat, and said method further comprises:
    a) disposing third and fourth paired lugs proximal to said first and second ends, respectively, of said mat;
    b) separating said mat into first and second surface portions such that said first and second paired lugs are disposed on said first surface portion and said third and fourth paired lugs are disposed on said second surface portion;
    c) using said first and second paired lugs to invertedly straddle said partition; and
    d) using said third and fourth paired lugs to invertedly straddle another partition.

14. A method for feeding pigs over a grated floor, which method comprises:
    a) confining pigs within a feeding stall having first and second side partitions;
    b) placing a mat onto said grated floor proximal to said side partitions;
    c) placing granulated food onto said mat;
    d) restraining movement of said food from said mat; and
    e) draining fluids from said mat.

15. A method as claimed in claim 14 which method further comprises:
    a) confining other pigs in a second feeding stall having first and second side partitions;

b) positioning said first side partition of said second feeding stall adjacent to said second side partition of the first said feeding stall;
c) the first said placing step comprising positioning a first surface portion of said mat in said first stall and a second surface portion of said mat in said second stall;
d) placing first and second paired lugs on said mat;
e) using said adjacent side partitions to straddle said paired lugs; and
f) said draining step comprises draining said fluid while said mat is in a substantially horizontal position.

16. A method as claimed in claim 14 which method further comprises:

a) confining other pigs in a second feeding stall that is connected to the first said feeding stall proximal to said second side partition;
b) positioning said second side partition of said first feeding stall as a shared partition between both of said stalls;
c) the first said placing step comprising positioning a first surface portion of said mat in said first stall and a second surface portion of said mat in said second stall;
d) placing paired lugs on said first surface portion;
e) using said paired lugs to invertedly straddle said shared partition; and
f) said draining step comprises draining said fluid while said mat is in a substantially horizontal position.

* * * * *

UNITED STATES PATENT AND TRADEMARK OFFICE
CERTIFICATE OF CORRECTION

PATENT NO. : 5,363,806
DATED : November 15, 1994
INVENTOR(S) : Carl W. Van Gilst It is certified that error appears in the above-indentified patent and that said Letters Patent is hereby corrected as shown below:

In the Abstract, replace "(26and" with --(26 and-- in line 8. In column 1, replace "mat; while" with --mat while-- in line 50; and replace "position and" with --position; and-- in line 51. In column 5, delete "or 52A" in line 31; and delete "to" in line 33. In Claim 12, line 31, replace "mat:" with --mat;--

Signed and Sealed this

Fifteenth Day of August, 1995

Attest:

BRUCE LEHMAN

Attesting Officer     Commissioner of Patents and Trademarks